United States Patent
Wu et al.

(10) Patent No.: US 10,762,718 B2
(45) Date of Patent: Sep. 1, 2020

(54) SYSTEM AND METHOD FOR DETERMINING MINIMAL NEGATIVE DISTANCE BETWEEN TWO OBJECTS

(71) Applicants: Wen-Jun Wu, Novi, MI (US); Bo Robert Zhou, Bloomfield Hills, MI (US); John Borth, Clarkston, MI (US); Dwayne Cervelli, West Bloomfield, MI (US)

(72) Inventors: Wen-Jun Wu, Novi, MI (US); Bo Robert Zhou, Bloomfield Hills, MI (US); John Borth, Clarkston, MI (US); Dwayne Cervelli, West Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 125 days.

(21) Appl. No.: 15/436,173

(22) Filed: Feb. 17, 2017

(65) Prior Publication Data
US 2018/0240278 A1    Aug. 23, 2018

(51) Int. Cl.
*G06T 19/20*    (2011.01)

(52) U.S. Cl.
CPC .......... *G06T 19/20* (2013.01); *G06T 2210/21* (2013.01); *G06T 2219/2016* (2013.01)

(58) Field of Classification Search
CPC .................................. G06T 19/20; G06T 17/20
USPC ........................................................ 345/419
See application file for complete search history.

(56) References Cited

U.S. PATENT DOCUMENTS

| | | | |
|---|---|---|---|
| 6,054,997 A | 4/2000 | Mirtich | |
| 6,061,627 A | 5/2000 | Sato | |
| 6,657,627 B1 | 12/2003 | Wada et al. | |
| 6,714,213 B1 | 3/2004 | Lithicum et al. | |
| 7,555,163 B2 | 6/2009 | Neto et al. | |
| 2007/0022389 A1* | 1/2007 | Ording | G06F 3/0481 715/790 |
| 2011/0221633 A1 | 9/2011 | Schramm et al. | |
| 2015/0109420 A1* | 4/2015 | Masuda | G01B 11/245 348/47 |
| 2015/0145985 A1* | 5/2015 | Gourlay | G06T 17/00 348/135 |
| 2015/0294510 A1 | 10/2015 | Gotte et al. | |

FOREIGN PATENT DOCUMENTS

EP    2434468 A1    3/2012

* cited by examiner

*Primary Examiner* — Jin Ge
(74) *Attorney, Agent, or Firm* — Ralph E. Smith

(57) ABSTRACT

A system and method is disclosed for determining an optimal direction and a minimum directional negative distance between two objects. The system and method uses an iterative process involving rotating a vector about two or more axes to obtain a group of new vectors, determining which one of the new group of vectors has the smallest directional negative distance, comparing the vector having the smallest directional negative distance to a preset value, and repeating the above operations as needed until a vector is obtained which does not exceed the preset value, and which is then identified as the optimum directional vector having a minimal directional negative value.

19 Claims, 4 Drawing Sheets

SYSTEM AND METHOD FOR DETERMINING MINIMAL NEGATIVE DISTANCE BETWEEN TWO OBJECTS

FIELD

The present disclosure relates to systems and method for determining distances between two partially overlapping models, and more particularly to a system and method for more accurately determining an optimal direction which represents a minimum directional negative distance between the two overlapping three dimensional models.

BACKGROUND

The statements in this section merely provide background information related to the present disclosure and may not constitute prior art.

Present day software tools are available for three dimensional (3D) visualization and mockup modeling of parts or structures. One such visualization software package is "Lifecycle Visualization Mockup" which is available from Siemens PLM Software of Plano, Tex. Another such software visualization package is available from "Catia" modeling software available from 3DS Dassault Systems.

However, when attempting to separate partially overlapping first and second 3D models, the software needs to determine both a direction (i.e., vector) and a directional negative distance by which one model needs to be moved relative to the other, to eliminate the overlap between the two 3D models. This presents a particular challenging task for present day visualization and modeling software tools. The error in this determination can range 100% or more for certain present day visualization/modeling systems and software tools.

SUMMARY

In one aspect the present disclosure relates to a method for electronically determining an optimal vector and a minimal negative distance between a first object and a second object. The method may comprise an operation a) of using a controller to determine a starting vector V that defines a direction of movement of the second object relative to the first object, and an operation b) of using the controller to determine a directional negative distance D for vector V. The method may further involve performing an operation c) to use the controller to rotate vector V in a plurality of directions to define a plurality of additional vectors, and performing an operation d) to use the controller to compare directional negative distances defined by each one of the plurality of additional vectors with one another to determine which represents a smallest directional negative distance, and identifying the one of the plurality of additional vectors having the smallest directional negative distance as vector V' and its associated directional negative distance as D'. The method may further involve performing an operation e) to use the controller to obtain a difference between D and D', and an operation f) that uses the controller to determine if the difference between D and D' is no greater than a set value. If this operation test shows that the difference between D and D' is greater than the set value, then the controller may be used to repeat operations c) through f) until the controller determines that distance D is no greater than the set value, and then identifying V as an optimal vector $V_{opt}$ having a minimal directional negative distance $D_{min}$.

In another aspect the present disclosure relates to a method for electronically determining an optimal vector and a minimal negative distance between a first object and a second object in a three dimensional coordinate space. The method may comprise using a controller to determine a starting vector V that defines a direction of movement of the second object relative to the first object. The method may further involve using the controller to rotate the vector V to define vectors V1 through V6, where:

vector V1 represents the vector V rotated by a first predetermined X value about an X axis of the three dimensional coordinate space;

vector V2 represents the vector V rotated by a second predetermined X value about the three dimensional coordinate space;

vector V3 represents the vector V rotated by a first predetermined Y value about the three dimensional coordinate space;

vector V4 represents the vector V rotated by a second predetermined Y value about the three dimensional coordinate space;

vector V5 represents the vector V rotated by a first predetermined Z value about the three dimensional coordinate space; and vector V6 represents the vector V rotated by a second predetermined Z value about the three dimensional coordinate space. The method may further involve using the controller to determine a directional negative distance D1-D6 for vectors V1-V6, respectively. Still further, the method may involve using the controller to determine which one of distances D1-D6 represents a smallest distance value, and designating the one of vectors V1-V6 having the smallest distance value as distance D' and vector V'. Furthermore, the method may involve using the controller to compare distance D' to a preset value to determine if D' exceeds the preset value, and when distance D' exceeds the preset value, then resetting distance D equal to D'. Still further, the method may involve using the controller to repeat the rotations of vector V to generate a new groups of vectors V1-V6 having new distances D1-D6, until a smallest one of the new distances D1-D6 does not exceed the preset value, and then using the controller to identify the smallest one of the new distances as an optimal directional negative distance $D_{opt}$ and its associated vector as an optimal direction $V_{opt}$.

In still another aspect the present disclosure relates to a system for electronically determining an optimal vector and a minimal negative distance between a first object and a second object. The system may comprise a controller to determine a starting vector V that defines a direction of movement of the second object relative to the first object. The controller may be configured to:

a) determine a directional negative distance D for vector V;

b) rotate vector V in a plurality of directions to define a plurality of additional vectors;

c) compare directional negative distances defined by each one of the plurality of additional vectors with one another to determine which represents a smallest directional negative distance, and identifying the one of the plurality of additional vectors having the smallest directional negative distance as vector V' and its associated directional negative distance as D';

d) obtain a difference between D and D';

e) determine if the difference between D and D' is no greater than a set value, and if not, then again setting vector V equal to vector V' and distance D equal to distance D', and again using the controller to rotate vector V in a plurality of directions; and repeat operations b) through e) until it is determined that distance D is no greater than the set value, and then identifying V as an optimal vector $V_{opt}$ having a minimal directional negative distance $D_{min}$.

BRIEF DESCRIPTION OF THE DRAWINGS

The drawings described herein are for illustration purposes only and are not intended to limit the scope of the present disclosure in any way.

DETAILED DESCRIPTION

Figure 1:
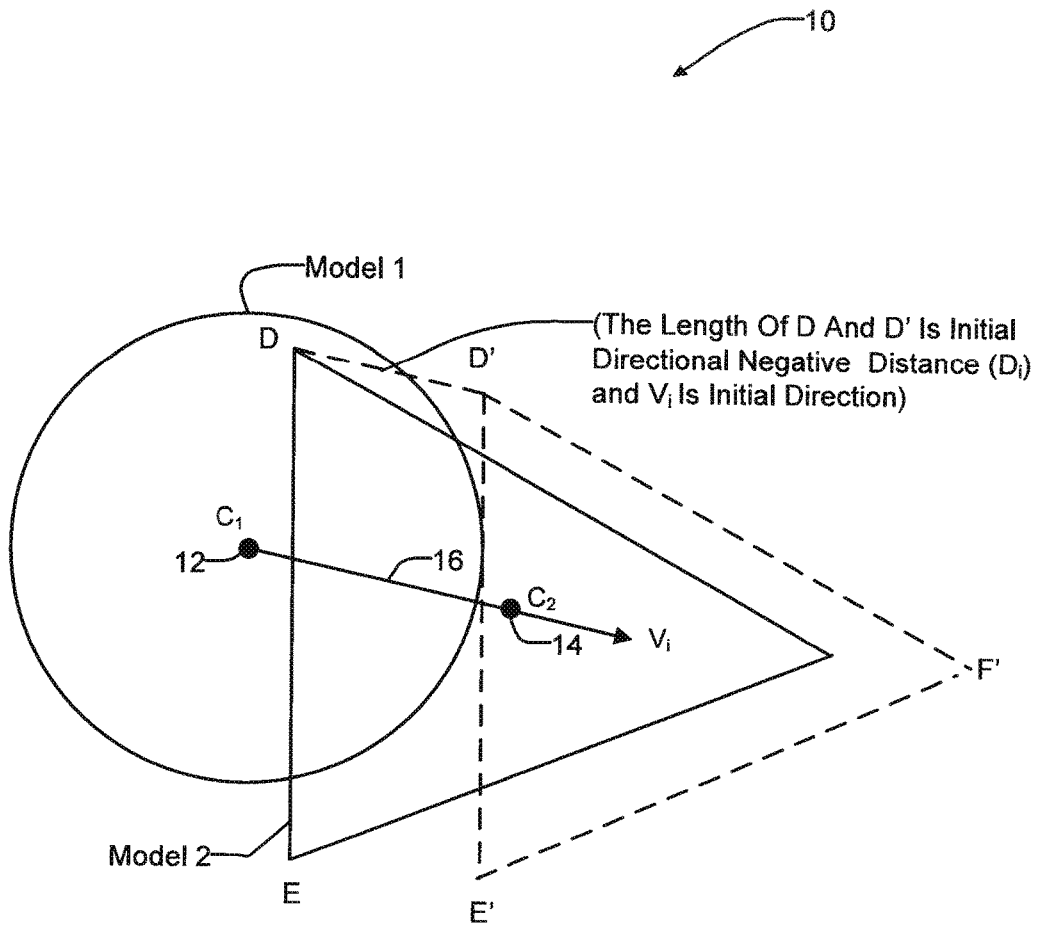
FIG. 1 is a diagram of two 3D models in a 3D environment, and illustrating an initial vector (NA) that represents a direction and an initial negative distance between the two 3D models, and where the initial vector Vi is defined by the centers (C1 and C2) of each 3D model.

The following description is merely exemplary in nature and is not intended to limit the present disclosure, application, or uses. It should be understood that throughout the drawings, corresponding reference numerals indicate like or corresponding parts and features.

Referring to FIG. 1, there is shown a diagram 10 illustrating two partially overlapping 3D models or objects C1 and C2. Point 12 is the center of model C1 and point 14 is the center of model C2. Arrow 16 represents a vector $V_i$ having an initial direction, in this example between the center points 12 and 14, and which has an initial directional negative distance "D". By "directional negative distance" it is meant that distance by which one of the models C1 or C2 needs to be moved, along the direction of vector V, to just separate the models (i.e., that point of just eliminating the overlap). Each end of the initial vector $V_i$ will also have associated with it X, Y and Z coordinates which can be labeled C1x, C1y, C1z and C2x, C1y and C2z.

Figure 2:
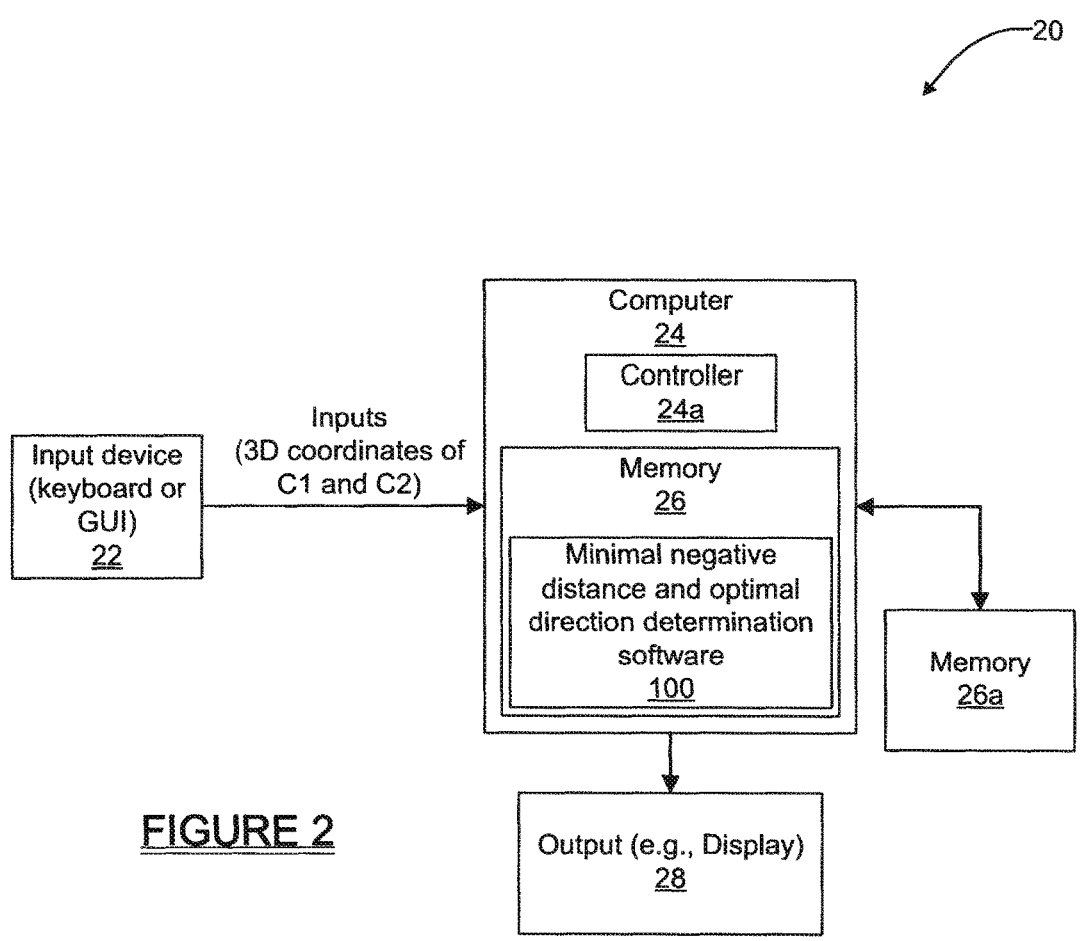
FIG. 2 is a high level block diagram of one embodiment of the present disclosure.

Referring to FIG. 2, a system 20 is shown in accordance with one embodiment of the present disclosure 20. The system 20 may include an input device 22, such as a keyboard or touchscreen display, which allows the user to input the X, Y and Z coordinates of center points C1 and C2. The input device 22 supplies the user selected inputs to a computer 24 which has a controller (e.g., processor) 24a. The controller 24a communicates with a memory 26 which includes a software module 100 for iteratively determining an optimal vector V' having an optimal minimal negative distance D' between center points 12 and 14 of models C1 and C2. Optionally, the memory 26 may be independent of the computer 24, such as illustrated by memory 26a. If the independent memory 26a is employed, then the software module 100 may be stored in the independent memory 26a instead. However, the present disclosure is not limited to any particular configuration of computer system, memory, or input device. The results of the calculations performed by the controller 24a may be presented on a display 28, for example an LCD display, an LED display, a CRT display, etc. If the input device 22 is a touchscreen display, then separate display 28 may not be needed.

Figure 3A:
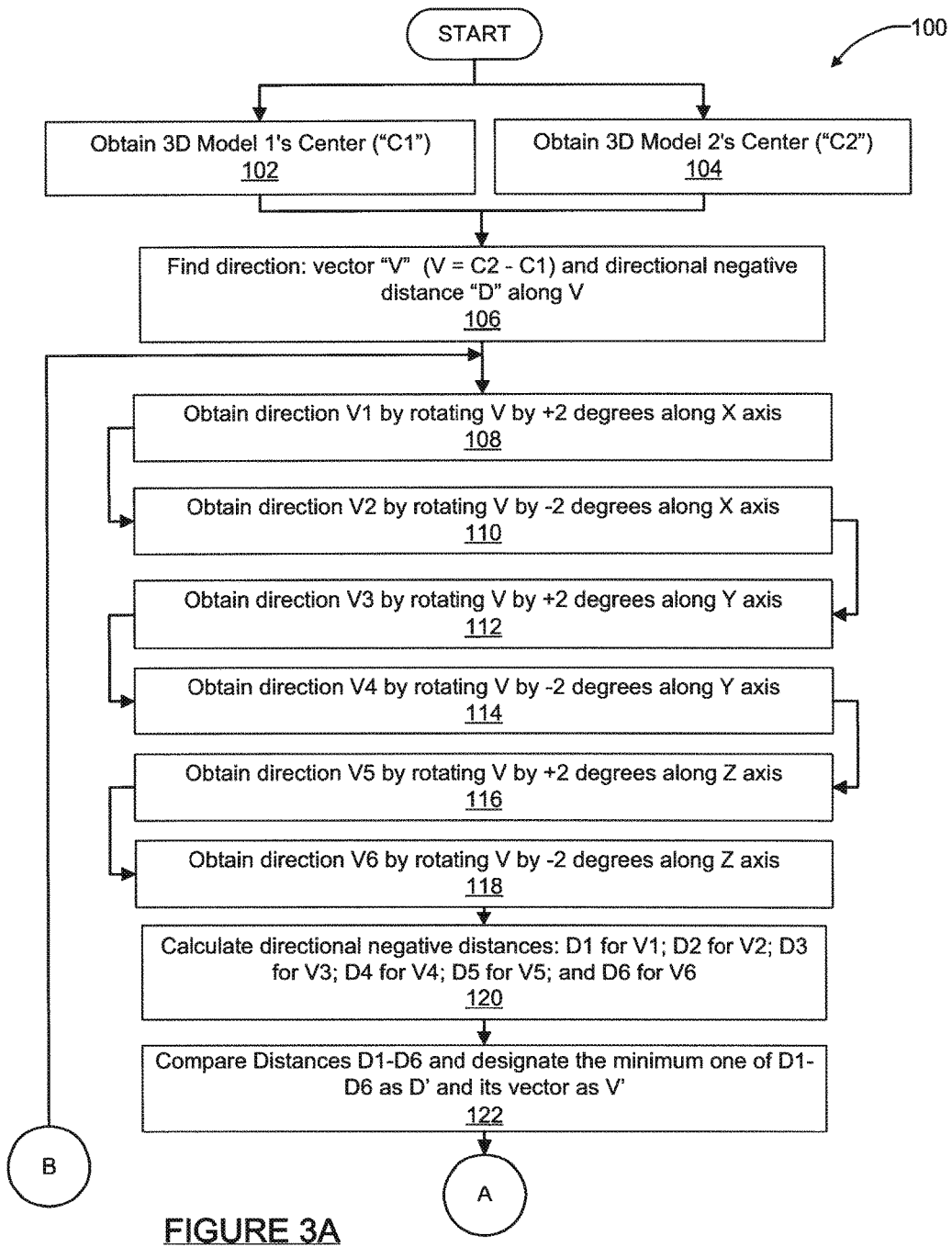
FIGS. 3A and 3B represent a flowchart illustrating one embodiment of a sequence of operations performed by the system of FIG. 2 to identify the minimal negative and optimal vector (V').
Figure 3B:
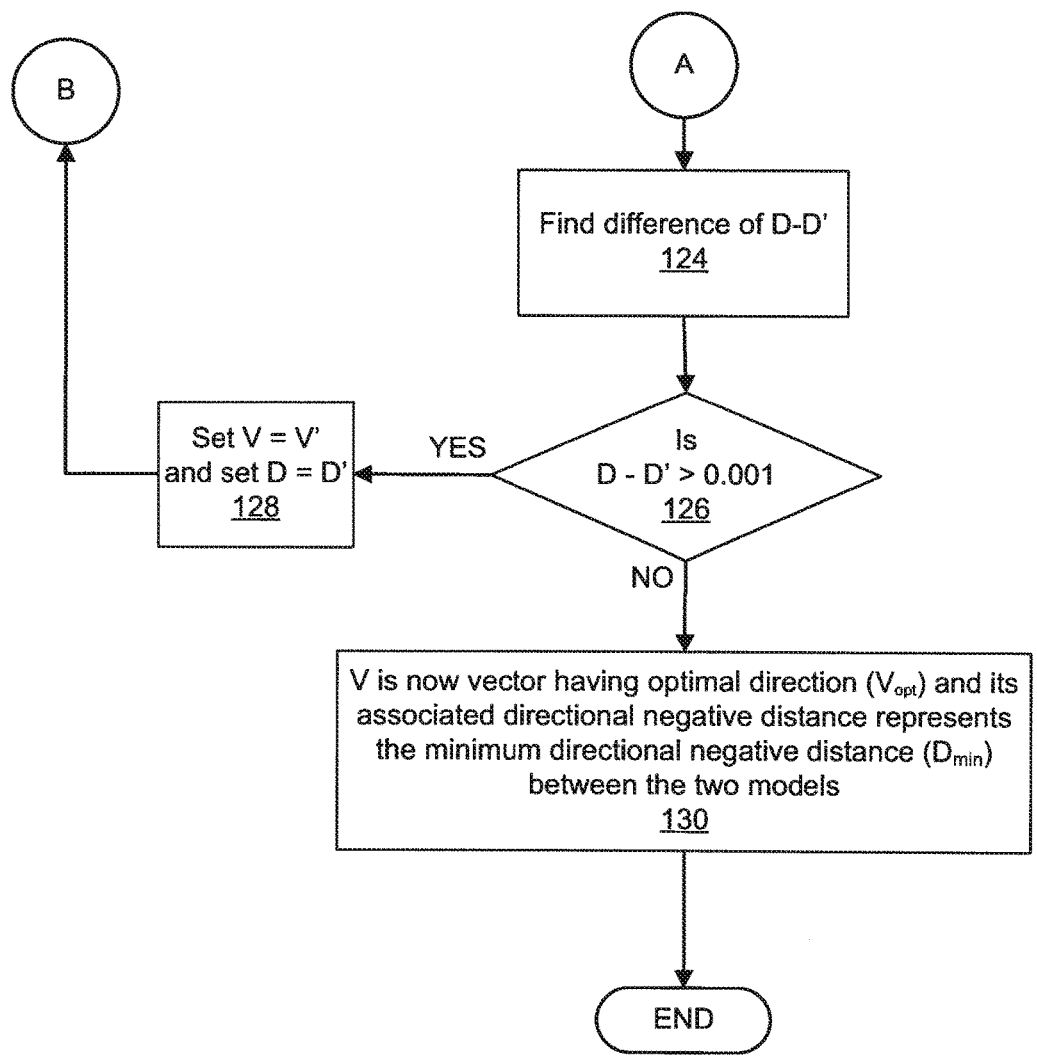

Referring to FIGS. 3A and 3B, various operations that may be performed by the software module 100 are shown. It will be appreciated that the order of operations shown in FIGS. 3A and 3B may be modified without departing from the scope of the present disclosure.

At operations 102 and 104, the X, Y and Z coordinates for the center points 12 and 14 of models C1 and C2 are received as inputs to the computer 24. At operation 106 the initial direction, represented by vector $V_i$ and its corresponding initial directional negative distance D, are determined by the controller 24a using the X, Y, and Z coordinates of center points C1 and C2 (i.e., V=C2−C1). It will be appreciated that the initial vector V can be defined along any direction, and setting the initial direction as a vector extending between points C1 and C2 is merely intended as one example of how vector V may be initially defined. The initial directional negative distance D is the distance of the initial vector $V_i$.

At operations 108 through 120 vectors V1-V6 are obtained by using the controller 24a to rotate vector $V_i$ by +2 degree and −2 degree values about its X, Y and Z axes. Thus, in this example vector V1 represents the X coordinate of vector $V_i$ at center point 14 rotated by a value of +2 degrees on the X axis, and this distance is designated as D1. Vector V2 represents the vector $V_i$ rotated by a value of −2 degrees on the X axis, and its distance is designated as D2; Vector V3 represents vector $V_i$ rotated by a value of +2 degrees on the Y axis with its distance designated as D3; vector V4 represents the vector $V_i$ rotated by a value of −2 degrees on the Y axis, and its distance designated as D4; vector V5 represents the vector $V_i$ rotated by a value of +2 degrees on Z axis, and its distance designated as D5; and vector V6 represents the vector $V_i$ rotated by a value of −2 degrees on the Z axis, and its distance designated as D6. This results in six vectors V1-V6 representing rotations of vector $V_i$ by values of +2 degrees and −2 degrees about each of the X, Y and Z axes.

At operation 122 the distances D1-D6 associated with vectors V1-V6 are compared by the controller 24a to identify which one represents the minimum directional negative distance. This vector is designated as V' and its distance is designated D'.

At operation 124, the controller 24a determines the difference between the minimum directional negative distance D' and the current value of D (i.e., D-D'). At operation 126, the controller 24a determines if this difference is greater than a preset value, for example 0.001. If the check at operation 126 produces a "Yes" answer, then at operation 126 the controller 24a sets V equal to V' and sets the distance D equal to D' for the next iterative rotation process. Operations 108-122 are then repeated by the controller 24a, but this time using the new vector V, which enables a new set of directional negative distances D1-D6 to be determined.

When the test at operation 126 produces a "No" answer, then a determination is made that the current vector V represents the optimal vector $V_{opt}$, which has the minimum directional negative distance $D_{min}$ between the models 12 and 14, as indicated at operation 130.

Thus, operations 106-128 serve to gradually determine, in a successive or iterative process, the optimal vector $V_{opt}$ and minimal directional negative distance $D_{min}$ by successively rotating the vector V and comparing the vector V1-V6 with the smallest directional negative distance (V', D') against the preset value, until the comparison shows that the difference between D and D' is no greater than the preset value (e.g., 0.001). When this point is reached, the current vector V and its directional negative distance D will be the optimal vector $V_{opt}$ and will have the minimal directional negative distance $V_{min}$.

The system 20 and its software module 100 thus enable an iterative process to be carried out which quickly identifies the optimal vector $V_{opt}$ and the minimal directional negative distance $D_{min}$ between the models 12 and 14 shown in FIG. 1. These models 12 and 14, as will be appreciated, may take shapes other than circles, and may differ from each other in shape. The use of circles in FIG. 1 is merely meant to show one example of the shapes that the models 12 and 14 may take and the system 20 and software module 100 are not limited to use with models having any specific shape. The system 20 and software module 100 may be used for one dimensional or two dimensional scenarios as well, and therefore is not limited to use in only 3D modeling applications.

The accuracy of $V_{opt}$ and $D_{min}$ will be determined by the preset value used. In the example above the preset value is 0.001, although the methodology described herein may be used with a larger or smaller preset value. Obtaining a higher degree of accuracy will involve using a preset value which is even smaller than 0.001, while a lesser degree of accuracy may be obtained using a preset value larger than 0.001. The needs of a specific application may dictate the degree of accuracy required.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for electronically determining an optimal vector and a minimal negative distance between overlapping first and second 3D models to translate the overlapping first and second 3D models with respect to each other so that they don't overlap each other the method comprising:
   a) using a controller to determine a starting vector $V_i$ that defines a direction of movement of the second 3D model relative to the first 3D model;
   b) using the controller to determine a directional negative distance D for vector $V_i$;
   c) using the controller to rotate vector $V_i$ in a plurality of directions, about each one of X, Y and Z axes, to define a plurality of additional vectors V;
   d) using the controller to compare directional negative distances defined by each one of the plurality of additional vectors with one another to determine which represents a smallest directional negative distance, and identifying the one of the plurality of additional vectors having the smallest directional negative distance as vector V' and its associated directional negative distance as D';
   e) using the controller to obtain a difference between D and D';
   f) using the controller to determine if the difference between D and D' is no greater than a set value, and if not, then again setting vector V equal to vector V' and distance D equal to distance D';
   using the controller to repeat operations c) through f) until the controller determines that distance D is no greater than the set value, and then identifying V as an optimal vector $V_{opt}$ having a minimal directional negative distance $D_{min}$; and
   using the controller to translate the first and second 3D models with respect to each other along the optimal vector $V_{opt}$ the minimal directional negative distance $D_{min}$.

2. The method of claim 1, wherein the plurality of additional vectors comprises six additional vectors V1 through V6 created by rotating vector V about the X, Y and Z axes.

3. The method of claim 2, wherein vector V1 represents the vector V rotated about the X axis by a first predetermined X value, and has a directional negative distance labelled D1.

4. The method of claim 2, wherein vector V2 represents the vector V rotated about the X axis by a second predetermined X value, and has a directional negative distance labelled D2.

5. The method of claim 2, wherein vector V3 represents the vector V rotated about the Y axis by a first predetermined Y value, and has a directional negative distance labelled D3.

6. The method of claim 2, wherein vector V4 represents the vector V rotated about the Y axis by a second predetermined Y value, and has a directional negative distance labelled D4.

7. The method of claim 2, wherein vector V5 represents the vector V rotated about the Z axis by a first predetermined Z value, and has a directional negative distance labelled D5.

8. The method of claim 2, wherein vector V6 represents the vector V rotated about the Z axis by a second predetermined Z value, and has a directional negative distance labelled D6.

9. The method of claim 1, wherein using the controller to generate the plurality of additional vectors comprises using the controller to rotate vector V to generate six additional vectors V1-V6, each representing a corresponding directional negative distance D1-D6, and where the rotation of the vector V is made by two different values about each one of X, Y and Z axes.

10. The method of claim 9, wherein:
    the two different values of rotation about the X axis represent first and second predetermined values of +2 and −2 about the X axis;
    the two different values of rotation about the Y axis represent third and fourth predetermined values of +2 and −2 about the Y axis; and
    the two different values of rotation about the Z axis represent fifth and sixth predetermined values represent +2 and −2 about the Z axis.

11. A method for electronically determining an optimal vector and a minimal negative distance between overlapping first and second 3D models to translate the overlapping first and second 3D models with respect to each other so that they don't overlap each other, the method comprising:
    using a controller to determine a starting vector V that defines a direction of movement of the second 3D model relative to the first 3D model;
    using the controller to rotate the vector V about each one of X, Y and Z axes, to define vectors V1 through V6, where:
        vector V1 represents the vector V rotated by a first predetermined X value about an X axis of the three dimensional coordinate space;
        vector V2 represents the vector V rotated by a second predetermined X value about the three dimensional coordinate space;
        vector V3 represents the vector V rotated by a first predetermined Y value about the three dimensional coordinate space;

vector V4 represents the vector V rotated by a second predetermined Y value about the three dimensional coordinate space;

vector V5 represents the vector V rotated by a first predetermined Z value about the three dimensional coordinate space;

vector V6 represents the vector V rotated by a second predetermined Z value about the three dimensional coordinate space;

using the controller to determine a directional negative distance D1-D6 for vectors V1-V6, respectively;

using the controller to determine which one of distances D1-D6 represents a smallest distance value, and designating the one of vectors V1-V6 having the smallest distance value as distance D' and vector V';

using the controller to compare distance D' to a preset value to determine if D' exceeds the preset value, and when distance D' exceeds the preset value, then resetting distance D equal to D';

using the controller to repeat the rotations of vector V to generate a new groups of vectors V1-V6 having new distances D1-D6, until a smallest one of the new distances D1-D6 does not exceed the preset value, and then using the controller to identify the smallest one of the new distances as an optimal directional negative distance $D_{opt}$ and its associated vector as an optimal vector $V_{opt}$; and using the controller to translate the first and second 3D models with respect to each other along the optimal vector $V_{opt}$ the minimal directional negative distance $D_{opt}$.

12. The method of claim 11, wherein the first predetermined X value comprises a value of +2.

13. The method of claim 11, wherein the second predetermined X value comprises a value of −2.

14. The method of claim 11, wherein the first predetermined Y value comprises a value of +2.

15. The method of claim 11, wherein the second predetermined Y value comprises a value of −2.

16. The method of claim 11, wherein the first predetermined Z value comprises a value of +2.

17. The method of claim 11, wherein the second predetermined Z value comprises a value of −2.

18. The method of claim 11, wherein all of the first predetermined values for X, Y and Z have the same value.

19. A system for electronically determining an optimal vector and a minimal negative distance between overlapping first and second 3D models to translate the overlapping first and second 3D models with respect to each other so that they don't overlap each other, the system comprising:

a controller to determine a starting vector V that defines a direction of movement of the second 3D model relative to the first 3D model;

the controller being configured to:
a) determine a directional negative distance D for vector V;
b) rotate vector V in a plurality of directions about each one of X, Y and Z axes, to define a plurality of additional vectors;
c) compare directional negative distances defined by each one of the plurality of additional vectors with one another to determine which represents a smallest directional negative distance, and identifying the one of the plurality of additional vectors having the smallest directional negative distance as vector V' and its associated directional negative distance as D';
d) obtain a difference between D and D';
e) determine if the difference between D and D' is no greater than a set value, and if not, then again setting vector V equal to vector V' and distance D equal to distance D', and again using the controller to rotate vector V in a plurality of directions; and repeat operations b) through e) until it is determined that distance D is no greater than the set value, and then identifying V as an optimal vector $V_{opt}$ having a minimal directional negative distance $D_{min}$; and translate the first and second 3D models with respect to each other along the optimal vector $V_{opt}$ the minimal directional negative distance $D_{min}$.

* * * * *